2,783,552

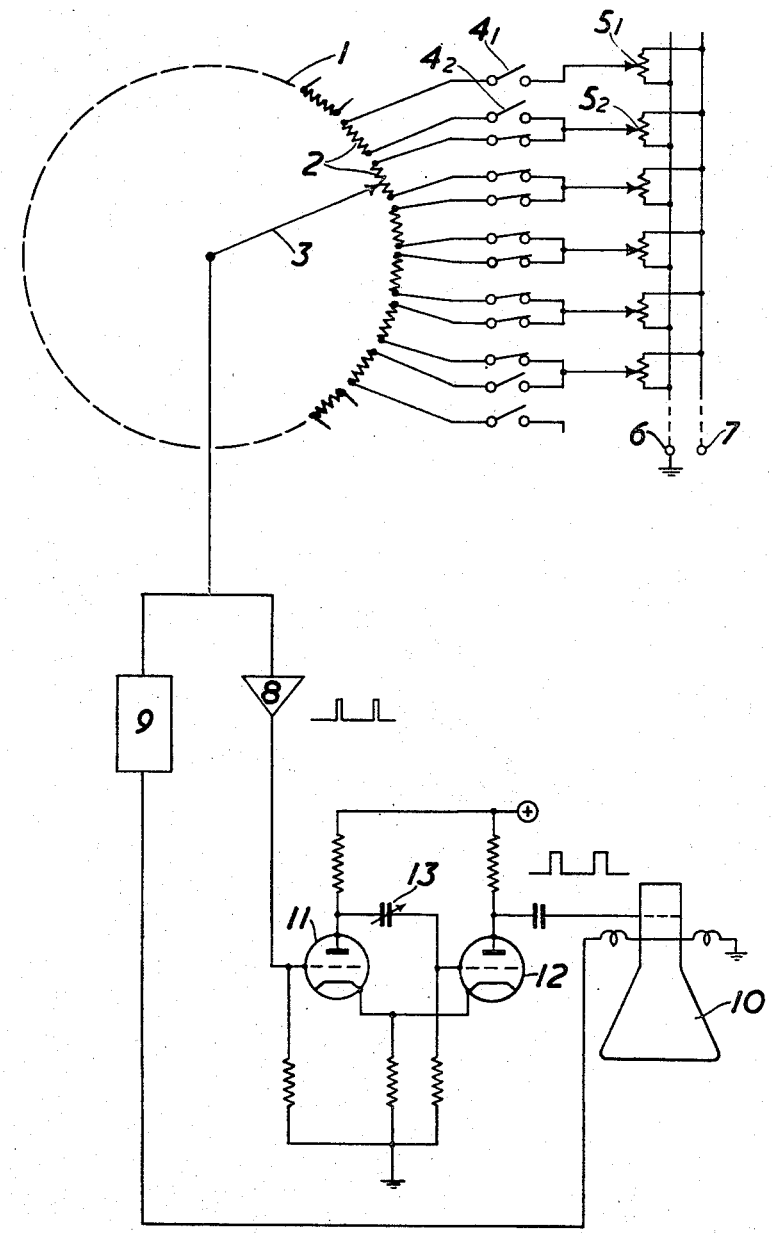

RADAR SIMULATION

Albert Ernest Cutler, Crawley, England, assignor to Communications Patents Limited Application February 2, 1955, Serial No. 485,638

Claims priority, application Great Britain February 8, 1954

3 Claims. (Cl. 35—10.4)

This invention relates to radar training apparatus.

It has been proposed to train radar operators, pilots, etc., in the use of radar by means of radar simulation apparatus including a cathode ray tube on the screen of which synthetic echoes are produced.

A coastline or "window," i. e. the aluminium foil which is sometimes dropped by an aircraft seeking to obscure a radar picture of the area in which it is flying, produces a strip-like image or images on the screen of the cathode ray tube radar display. Such images tend to obscure echoes from ships, aircraft or other objects in the vicinity and thus increase the difficulties of radar operators, pilots, etc., who are trying to read from the screen information regarding these ships or aircraft.

It is an object of the present invention to enable the appearance of coastlines, "window" or the like to be reproduced synthetically on the screen of a cathode ray tube in order to facilitate the training of radar operators.

According to one aspect of the invention, apparatus for simulating the appearance on a screen of echoes from radar beam signals, includes a cathode ray tube, means adapted to generate a first voltage representing the range of an assumed echo at a given azimuth, means for varying the amplitude of the first voltage in accordance with assumed change of azimuth of the beam, means adapted to generate a range scanning voltage and arranged to apply the latter to the deflection circuits of the tube, means controlled jointly by the first voltage and the range scanning voltage and adapted to produce in a range scanning cycle a pulse which is delayed in proportion to the first voltage, and means arranged to apply the pulse to a brightness control circuit associated with the tube whereby a trace is produced on the screen of the tube during the range scanning cycle at a range corresponding to the first voltage.

In order that the invention may be better understood, a preferred embodiment thereof will now be described, by way of example only, with reference to the drawing accompanying the specification.

In this arrangement the circular potentiometer 1 consists of a number of separate resistance sections 2, insulated from one another, and a rotary wiper 3 which is driven at the same speed as and in angular synchronism with the simulated scanning aerial. The wiper 3 has a contact end of sufficient width to bridge the gap between adjacent sections 2. The ends of each resistance section 2 are connected through switches $4_1$ and $4_2$ to the wipers of two potentiometers $5_1$ and $5_2$, the adjacent ends of any pair of adjacent resistance sections being connected through separate switches to the wiper of a single potentiometer such as $5_1$. The potentiometers $5_1$, $5_2$, etc., are connected in parallel across two terminals 6 and 7, one of which is earthed and the other of which is given a potential of 10 volts positive.

It will be seen that by closing a group of adjacent switches, a voltage output can be obtained from the rotary wiper 3 as this wiper passes over the corresponding arc of the resistance sections 2. The variation of the output from the wiper 3 is determined by the settings of those potentiometers $5_1$, $5_2$, etc., which are connected to the closed switches, and owing to the provision of a bridging contact on the end of the wiper 3 and to the fact that adjacent ends of the resistance sections 2 are connected to the same point on one of the potentiometers $5_1$, $5_2$, etc., the variation of the output is smooth.

The rotary wiper 3 is connected to a comparator 8 to which there is also applied a signal of sawtooth waveform (negative-going) derived from a time-base unit 9. This signal is also applied as a range strobe deflection signal to the deflection coils of a cathode ray tube 10, these coils being rotated around the neck of the associated tube 10 in accordance with assumed rotation of the scanning beam, i. e. in synchronism with the rotation of the wiper 3. The synchronous rotation of the wiper 3 and of the deflection coils of tube 10 can be achieved by any conventional mechanical or electrical coupling between the means for rotating the wiper and the usual means for rotating the coils. The comparator 8 is such that at the instant during a range strobe cycle when the amplitude of the sawtooth range signal from the time base unit exceeds that of the output of the wiper 3, a pulse is generated, so that the delay of the pulse from the initiation of the range strobe cycle is proportional to the amplitude of the output of the rotary wiper 3. The comparator may consist, for example, of a "multiar" circuit followed by a pulse shaping circuit, as is disclosed in the text book "Time Bases" by O. S. Puckle, 2d edition, at pages 356–360, and also in British specification No. 583,553.

The pulses from the comparator are applied to the grid of the first of two triodes 11 and 12 which are arranged in a conventional uni-stable circuit. The triode 12 is normally conducting, but is driven to a non-conducting condition by the application of a positive-going pulse to the grid of triode 11. The setting of the variable capacitor 13, which couples the anode of the triode 11 to the grid of triode 12, controls the delay in the return of the circuit to its stable condition after the removal of the pulse from the grid of triode 11, and thus also controls the width of the pulses obtained from the anode of the triode 12.

The pulses from the anode of the triode 12 are applied to the control electrode of the cathode ray tube 10. The delay between the commencement of each range strobe and the application to the grid of the tube 10 of the pulse from the triode 12 causes a spot to appear on the face of the tube at a range proportional to the amplitude of the voltage at the wiper 3.

By closing one or more groups of adjacent switches $4_1$, $4_2$, etc., the instructor can provide a line or lines simulating the appearance of "window" or of a coastline in the selected sectors of the cathode ray tube. The setting of any of the potentiometers $5_1$, $5_2$, etc., which is connected through a closed switch to one of the resistance sections 2, determines the apparent range of the "window" or coastline at the corresponding bearing on the screen of the cathode ray tube. In particular, it should be noted that the extreme ends of the interconnected potentiometer sections (i. e. those connected to closed switches) are not set as earth potential, but at potentials corresponding to the ranges of the ends of the coastline or "window" echo. By closing the appropriate switches $4_1$, $4_2$, etc., and adjusting the corresponding potentiometers $5_1$, $5_2$, etc., the instructor can give the line on the screen any desired direction or shape. The instructor controls the thickness of the line by means of the variable capacitor 13.

Other signals, such as pulses representing echoes from ships, can be applied to the grid of the cathode ray tube, in addition to the coastline or "window" echoes, by way of the conductor 14.

What I claim is:

1. Apparatus for simulating the appearance on a screen of echoes from radar beam signals, comprising a cathode ray tube, a brightness control circuit and deflection circuits therefor, a potentiometer unit including a wiper adjustable in accordance with the assumed azimuth of the beam and a plurality of potentiometer sections insulated from one another, the apparatus further comprising a plurality of voltage sources, a plurality of switching means through which said potentiometer sections can be connected to said voltage sources, means adapted to generate a range scanning voltage and arranged to apply the latter to said deflection circuits, means controlled jointly by said range scanning voltage and by the voltage at said wiper and adapted to produce, in a range scanning cycle, a pulse which is delayed in proportion to said voltage at said wiper, and means arranged to apply said pulse to said brightness control circuit, whereby a trace is produced on said tube during said range scanning cycle at a range corresponding to said voltage at said wiper, the beam azimuth for which said latter voltage is obtained being selected by closing corresponding ones of said switching means.

2. Apparatus as claimed in claim 1, comprising further potentiometer means including wipers to which said potentiometer sections are connected through said switching means, said wipers of said further potentiometer means being adjustable in accordance with the desired ranges of the echoes at the selected azimuths.

3. Apparatus for simulating the appearance on a screen of echoes from radar beam signals, comprising a cathode ray tube, a brightness control circuit and deflection circuits therefor, a potentiometer unit including a wiper rotatable in accordance with the assumed azimuth of the beam and a plurality of potentiometer sections arranged in a circle and insulated from one another, said wiper being such that it bridges adjacent potentiometer sections in passing from one to another, said apparatus further comprising a plurality of switching means, a plurality of further potentiometers including wipers to which said potentiometer sections are connected through said switching means, the beam azimuths for which an echo is desired being selected by closing corresponding switching means and the desired ranges of the echoes being set by means of said wipers of said further potentiometers, means adapted to generate a range scanning voltage and arranged to apply the latter to said deflection circuits, means controlled jointly by said range scanning voltage and by the echo-range voltage at said wiper of said potentiometer unit and adapted to produce, in a range scanning cycle, a pulse which is delayed in accordance with said echo-range voltage, and means arranged to apply said pulse to said brightness control circuit, whereby a trace is produced on said tube during said range scanning cycle at a range corresponding to said echo-range voltage.

References Cited in the file of this patent

UNITED STATES PATENTS

| | | |
|---|---|---|
| 2,517,591 | Nightenhelser | Aug. 8, 1950 |
| 2,519,802 | Wallman | Aug. 22, 1950 |
| 2,522,541 | Saxton et al. | Sept. 19, 1950 |
| 2,555,442 | Hales | June 5, 1951 |
| 2,605,556 | Jones | Aug. 5, 1952 |
| 2,652,636 | Garman et al. | Sept. 22, 1953 |
| 2,677,199 | Droz | May 4, 1954 |